(12) United States Patent
Windschmitt et al.

(10) Patent No.: US 6,178,989 B1
(45) Date of Patent: Jan. 30, 2001

(54) SAFETY ELEMENT FOR A DUCT

(76) Inventors: Hans Windschmitt, Hainerweg 248, 60599 Frankfurt; Frank Kampfmann, Dr.-Kaufmann-Str. 7, 63811 Stockstadt; Hannelore Kolb, Am Sonnenhang 11, 35415 Pohlheim-Hausen, all of (DE)

( * ) Notice: Under 35 U.S.C. 154(b), the term of this patent shall be extended for 0 days.

(21) Appl. No.: 09/171,556

(22) PCT Filed: Apr. 18, 1997

(86) PCT No.: PCT/DE97/00785

§ 371 Date: Oct. 26, 1998

§ 102(e) Date: Oct. 26, 1998

(87) PCT Pub. No.: WO97/40304

PCT Pub. Date: Oct. 30, 1997

(30) Foreign Application Priority Data

Apr. 19, 1996 (DE) .............................................. 196 15 472

(51) Int. Cl.⁷ .................................................. F16K 37/00
(52) U.S. Cl. .............................. 137/312; 137/375; 285/55
(58) Field of Search ................................... 137/312, 375; 285/55

(56) References Cited

U.S. PATENT DOCUMENTS

| | | | |
|---|---|---|---|
| 2,693,822 | * 11/1954 | Gerow et al. | 137/551 |
| 2,954,797 | * 10/1960 | Dryer | 137/375 |
| 2,994,337 | * 8/1961 | Freeman | 137/375 |
| 3,315,700 | * 4/1967 | Greenwood | 137/375 |
| 3,573,863 | 4/1971 | Doors et al. | 137/375 |
| 3,811,649 | * 5/1974 | Press et al. | 251/8 |
| 3,964,517 | * 6/1976 | Dickenson | 137/312 X |
| 4,617,955 | * 10/1986 | Melgaard | 137/312 X |
| 4,716,926 | * 1/1988 | Jacobs | 137/312 X |
| 5,056,759 | * 10/1991 | Schlesch | 251/330 |
| 5,203,370 | * 4/1993 | Block et al. | 137/312 |
| 5,228,472 | 7/1993 | Ougiya et al. | 137/312 |
| 5,546,977 | * 8/1996 | Chaney | 137/312 |
| 5,597,009 | 1/1997 | Scherrer et al. | 137/375 |
| 5,615,700 | * 4/1997 | Chaney et al. | 137/312 X |
| 5,810,040 | * 9/1998 | Ludwig | 137/312 X |

* cited by examiner

Primary Examiner—Kevin Shaver
Assistant Examiner—John Bastianelli
(74) Attorney, Agent, or Firm—Edwin D. Schindler

(57) ABSTRACT

A safety element is disclosed for influencing or inspecting fluid media in a duct, in particular a double-walled safety duct whose walls are separated by a hollow space. The safety element has a housing formed by walls and flanges for sealingly connecting it to the duct. The housing is surrounded on all sides by a second wall (6) separated from the first wall (5) by a hollow space (7) which is closed in a gas-tight manner and can be connected with measurement equipment for inspecting its contents. The hollow space (7) communicates through one or several bores (13) with a groove (15) shaped around the duct into the sealing surface (14) of the flange (1) or its seal (18).

12 Claims, 2 Drawing Sheets

SAFETY ELEMENT FOR A DUCT

BACKGROUND OF THE INVENTION

1. Technical Field of the Invention

Figure 1:
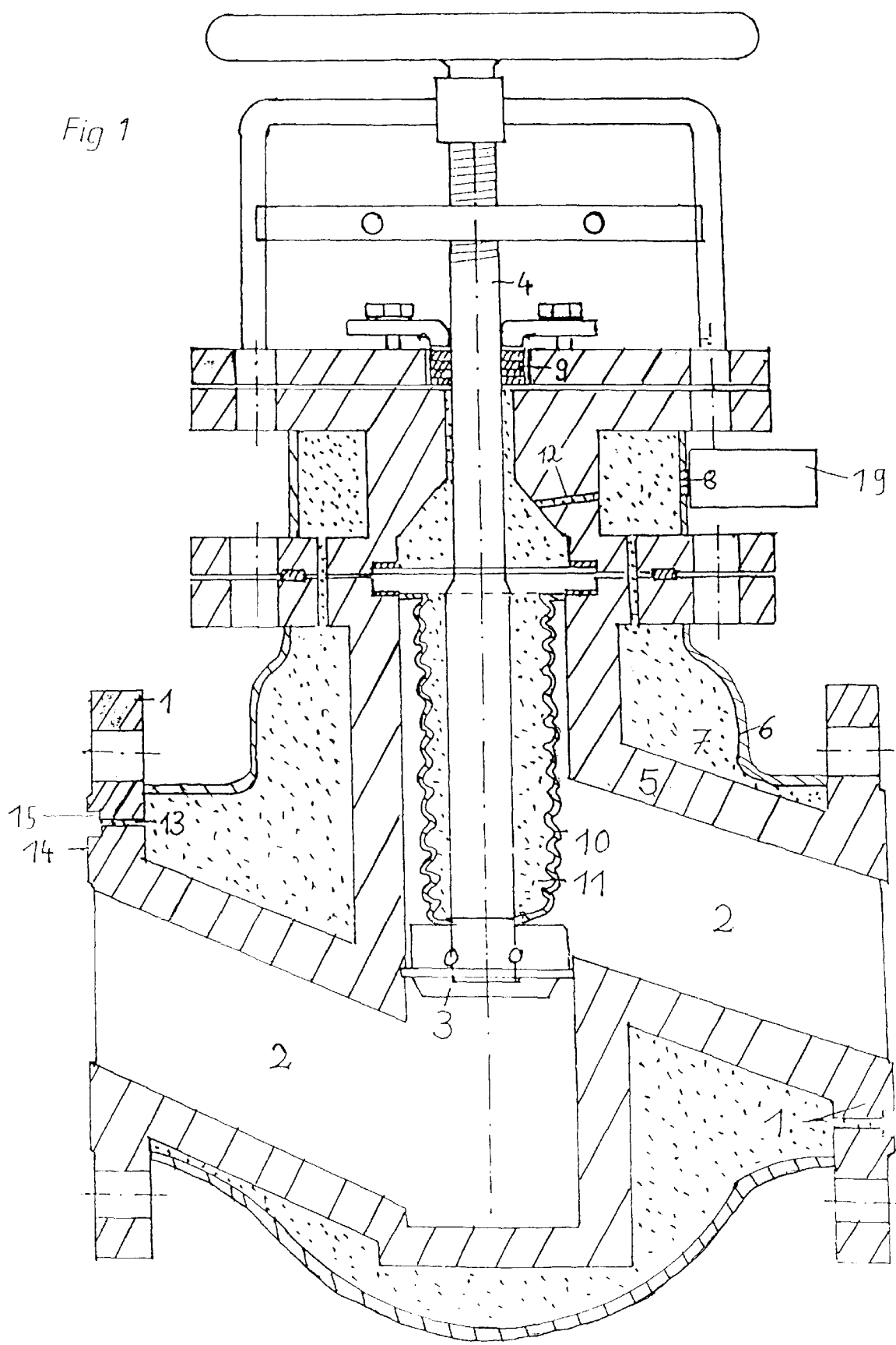

The invention concerns a safety function element to influence or control fluid mediums in a line, in particular a double-walled safety line whose walls are spaced at a distance to each other through a hollow space, the element being provided with a housing formed by walls and having as well flanges by means of which it can be connected tightly to the line.

2. Description of the Prior Art

In piping systems in many cases easily inflammable or explosive liquids as well as gases and products that endanger the water and are injurious to health and the environment are transported. Because an uncontrolled release of the transported medium would result in significant damage and risks, for preventive purposes, the use of double-walled safety lines is known, whose walls are spaced at a distance to each other through a hollow space. In this way not only is protection against an escape of the medium directly improved, it is also possible to connect the hollow space to a measuring device to check its contents, for example, a detection device for specific gases or a pressure gauge. Therefore a leak report and subsequent cut-off of transport through the line is effected as soon as the medium enters the hollow space so that the risk of a spillage affecting the environment is completely ruled out.

As a rule, lines are provided with a multitude of function elements. Examples are non-return or shutoff valves, slide valves, pumps or flow meters, which are connected respectively, via flanges, to the line pipes which may comprise rigid or flexible material. In the region of the function elements no suitable measures are known to provide protection against the medium leaking. On the one hand, this has the consequence that operationally the function elements represent a considerable source of danger with leakages occurring with above average frequency compared with the line. On the other hand, during the construction of a line it means significantly higher expenditure because permanent access must be guaranteed, also by statute, even if the line is laid underground, to the function elements. Therefore, in the state-of-the-art, the function element is fitted either in a shaft or an underground loop so that significant extra costs are the disadvantageous consequence. In addition to the function elements themselves, the flanges, to which they are connected, for example, by means of bolts to fit tightly with the adjacent line, represent further regions in which leaks occur especially frequently.

SUMMARY OF THE INVENTION

Against this background, it is the object of the invention to develop a safety function element which offers easily controlled and improved protection against leakage of the medium and therefore does not require direct access.

In accordance with the invention this task is solved therein that the housing is enclosed on all sides by a second wall, which is spaced at a distance to the first wall through a hollow space, which is closed so as to be gastight and connectable to a leak detection device to check its contents and which is connected via one or more bores to a groove which is disposed circumferentially to the line in the sealing surface of the flange or its seal.

The proposed safety function element is enclosed by a housing which has two walls, preferably made from steel, on all sides which are spaced at a distance to each other through a hollow space. The hollow space is closed so as to be gastight and is connectable or permanently connected to a leak detection device to check its contents. It is therefore possible to detect leakage of the medium into the hollow space and to undertake measures, in particular to switch off the line, before a leakage from the hollow space into the environment occurs. In order to also be able to detect a pending leak in the region of the flange, its sealing surface is provided with a groove circumferential to the line, which is, for example, milled. The depth of the groove is to be selected in such a way that the seal of the flange penetrates at most partially therein so that across its entire length a continuous channel is retained. Via one or more bores, or apertures produced in another way, the base of the groove is connected to the hollow space of the housing. If the medium located in the line penetrates into the sealing surface, that is, there is an imminent risk of a leak, it reaches the hollow space via the groove and the bores and can be detected there using the measuring device. In this event, safety measures can then also be taken.

The advantage of the function element according to the invention consists in significantly improved protection against leakage of the transported medium. Although its use is also suitable for a conventional single-wall line, the installation in a double-walled safety line is preferred. Owing to the improved protective effect, it is no longer necessary to have direct access to the element because safety measures can be taken prior to a pending leak and there is sufficient time for repairs. Independent of the type of monitoring, the proposed solution allows the detection of even the smallest leaks. In particular, this creates considerable cost advantages because there is no need to create line loops above ground or access shafts. Furthermore, outside enveloping or insulating layers do not impair the monitoring of the function element.

The function element according to the invention presents itself particularly in the case of shutoff devices, that is, slide valves or valves which comparatively frequently have to be installed in inaccessible regions. Furthermore, the embodiment according to the invention is also advantageous in the case of a non-return valve which likewise is frequently to be disposed inaccessibly. On the other hand, many other function elements, for example, dirt traps, pumps or flow meters, by way of contrast are generally arranged so as to be easily accessible, for instance, in a pumping station, so that direct monitoring is possible.

Function elements frequently have an active part which engages with the fluid medium, for example, the disk of a shutoff valve. Usually a mechanical coupler serves as actuation which acts through a leadthrough in the housing. For example, a valve disk is moved by means of spindle as a coupler so that it is adjustable via a handwheel or a motor that is attached to the housing. To prevent the medium from leaking along the leadthrough, in a development of the invention it is proposed to connect the active part to the housing to fit tightly via a bellows inside of which the coupler engages endwise. In this way, the fluid medium is divided by the leadthrough, while the bellows does not impair the movement of the active part owing to its deformability. Considerably improved protection against leakage of the medium is the advantageous consequence.

With the use of a bellows, it is practical if the volume between it and the housing can be connected to a leak detection device to check its contents so that failure of the bellows can also be detected.

The protection against a leakage of the medium can be further improved if the coupler leadthrough is achieved by means of one or more bushes, so-called safety bushes, which rest against the coupler so as to effect a tight seal. In particular, in the case of a plurality of bushes, in this way a good seal can be achieved even without a bellows.

For filling the hollow space between the housing walls, it presents itself to use a compressed gas, e.g. compressed air, or a vacuum. As a consequence, a leak can be detected simply through a change in the overall pressure so that a plain manometer is sufficient as the leak detection device. Basically, it is advantageous to be able to detect a leak in the interior wall facing the medium as well as in the outer wall facing the environment because in both cases a significantly higher risk of a leakage of the medium exists. This requirement is fulfilled when compressed air or a vacuum is introduced because in both cases the pressure changes. However, monitoring of the hollow space with a vacuum is not permitted for combustible, explosive substances and those that threaten the water. Therefore, filling the hollow space with a protective gas, for example, nitrogen, is conceivable. If a protective gas is located in the hollow space, it is advantageous to have a device that detects specifically the medium in the line to be able to detect even the smallest of leaks.

If the function element according to the invention is flange-mounted to a double-walled safety line, the hollow spaces of the safety line and housing are connected to one another. In addition, the groove is connected to the hollow space of the safety line via an aperture in the flange part of the safety line. A seal in the flange is provided with one or more apertures parallel to the axis of the line or comprises two concentric parts so that the connection between the groove and aperture is not interrupted in the flange part of the pipe.

A continuous connection of the hollow spaces of pipe parts via a function element located between them has the advantage that significant sections of the pipe can be monitored with one single leak detection device. If a leak is detected, there is the problem of the localization of the damaged place. Therefore, in a farther development it is proposed that the bore between the flange and the hollow space can be closed by means of a locking device, for example, a locking screw. Thereby it is basically immaterial whether the bore between the hollow space of the safety line and the flange is concerned or that of the housing and the flange. In both cases the line can be divided section-wise by closing the locking device so that the search for the leak is made significantly easier.

Suitably the cross-sectional area of the housing of the safety function element corresponds to the outer cross-section of the line in which it is used, i.e. the shapes of the outer walls of the line and housing correspond to each other. In this way, spatial problems are avoided during the installation of the safety function element because there is no expansion of the cross-section vis-à-vis the line. Small variations in the diameter are thereby conceivable, in particular, a slight expansion to facilitate a sufficient aperture cross-section of the function element to prevent excessive flow resistances. Cross-sectional areas of the line and the housing which correspond to each other present themselves in particular in the case of safety function elements which do not require activation from outside, for example, a non-return value.

BRIEF DESCRIPTION OF THE DRAWING FIGURES

Further details, features and advantages of the invention can be taken from the following descriptive part in which with the aid of the drawing a typical embodiment of the invention is described in greater detail. The drawing shows in schematic representation FIG. 1: cross-section of a shutoff valve according to the invention FIG. 2: cross-section of a non-return valve according to the invention.

DETAILED DESCRIPTION OF THE DRAWING AND PREFERRED EMBODIMENTS

The valve in FIG. 1 can be connected via two flanges (1) to pipes of a line whose course thus continues along a channel (2) whose cross-section can be closed or changed with the disk (3) of the valve. The actuation of disk (3) is affected by a spindle (4) that travels out of the housing of the valve and is movable via a handwheel which is attached to it endwise.

To increase safety against a leakage of the medium from channel (2), the valve is surrounded by two walls (5, 6), which enclose a hollow space (7). Furthermore, hollow space (7) is provided with a connection via which is connectable to a leak detection device (19), in particular a pressure gauge, to check its contents. If interior wall (5) of the valve is damaged, the medium flowing in channel (2) does not escape into the environment but into hollow space (7). The change of pressure arising can be detected by the leak detection device (19) fitted to connection (8) so that safety measures can be taken and the valve can be replaced before a leakage occurs through outer wall (6). If the hollow space (7) is filled with a medium other than air or with a pressure differing from the exterior air pressure, by means of the leak detection device (19), leaks in outer wall (6) can also be detected.

The execution of mechanical actuating elements, in the example of spindle (4), through the housing of the valve, requires special protection. The execution is effected through a number of bushes (9), so-called safety bushes, which rest against spindle (4) so as to fit tightly. The bottom end of spindle (4) is enclosed by a deformable bellows (10) which is connected to disk (3) and inner wall (5) so as to fit tightly. In this way, the volume (11) of a further hollow space is created between bellows (10) and inside wall (5), with the consequence that the medium located in channel (2) does not reach the leadthrough of spindle (4). Volume (11) also can be monitored by means of bore (12) via a leak detection device (19) to be able to detect a failure of bushes (9) or bellows (10).

To also guarantee the monitoring of flanges (1), they are provided inside with bores (13) which connect groove (15) extending circumferential to its sealing surface to hollow space (7). In the case of a faulty seal, the escaping medium reaches groove (15) and via bores (13) is directed into hollow space (7) where it is detectable by the leak detection device (19) via connection (8). Decisive is that groove (15) is disposed more or less in the center of sealing surface (14) so that the leak is detected before the seal has been penetrated in full and before leakage into the environment can take place. In this way, good protection against leaks is also given in the region of flange (1).

More specifically, the bores (13) are directed parallel to the axis of the line, and there could exist one or more bores that are distributed over the circumference of the line. The bores (13) define a channel between the hollow space (7) and the groove (15). The groove (15) itself is a type of depression in the frontal surface of the flange (1). Together with a flange of a neighboring line, the groove (15) defines a ring-shaped channel, which surrounds the line, with its purpose being to detect the leakage of gas between the two flanges connected to one another. Generally speaking, the groove (15) forms a closed loop, such as a ring, and may either be on the surface of the flange or in the sealing material itself.

Figure 2:
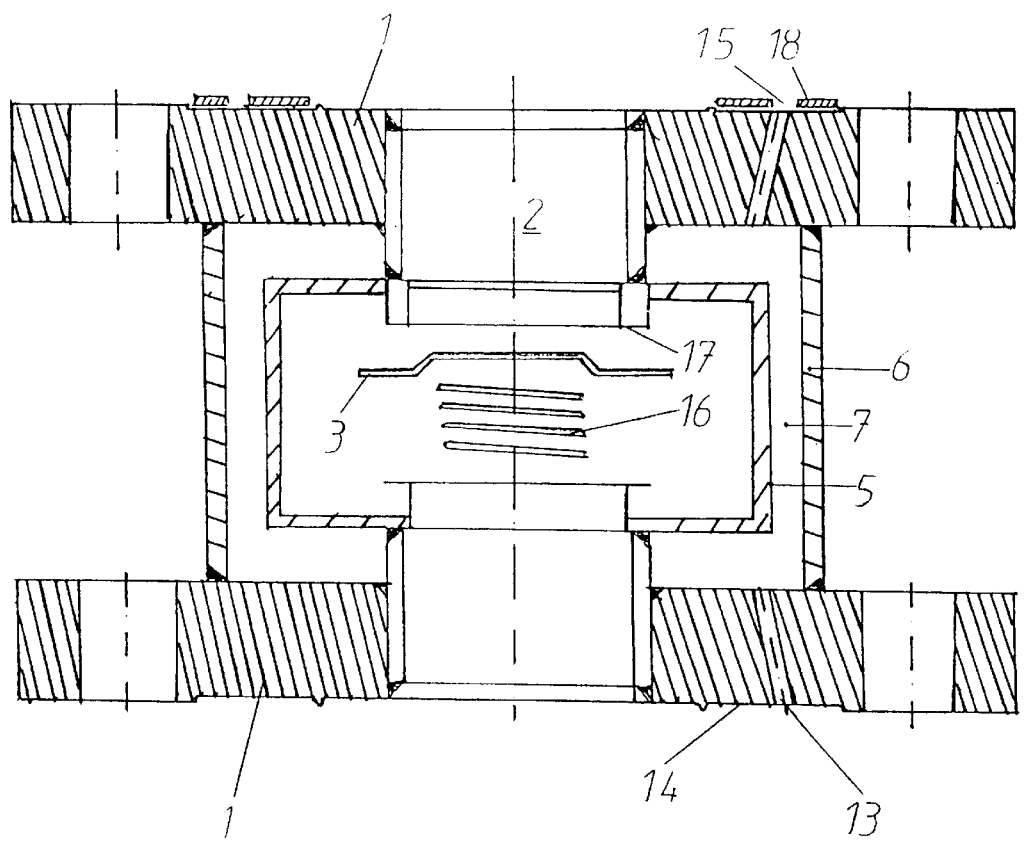

FIG. 2 shows a non-return valve according to the invention where the names of similar components correspond to those in FIG. 1. Disk (3) of the valve is affixed to a pressure spring (16) which is supported on inside wall (5) of the housing. If the liquid thus flows from top to bottom through the non-return valve, it is in an opened condition while pressure spring (16), in case of the reverse direction of flow, presses disk (3) against its seat (17) and thus closes the valve. The monitoring of hollow space (7) is effected in the case of this embodiment of the invention, for example, via connection (8), which is located in a component which is flange-mounted to flange (1) and is connected to hollow space (7) via bores (13). Groove (15), which runs circumferentially around sealing surface (14) is disposed in its sealing (18).

As a result one obtains an easy-to-monitor safety function element which improves protection against a leakage of mediums considerably and substantially simplifies the laying of such a line because the requirements in respect of accessibility of the element are reduced. The improvement in safety in all industrial sectors, in particular in the chemical industry, has entered a stage with the invention which allows damage to the environment to be avoided with reliable certainty.

What is claimed is:

1. A safety function element for influencing or controlling fluid medium in a line, comprising:

a housing formed by a first wall with said housing being enclosed on all sides by a second wall, said second wall being at a spaced-distance from said first wall with a hollow space existing between said first wall and said second wall, the hollow space being closed so as to be airtight, said housing having one or more flanges for connecting said housing to the line;

a leak detection device for detecting leakage into the hollow space, the hollow space being connected via one or more bores to a groove disposed circumferentially to the line in a sealing surface.

2. The safety function element according to claim 1, wherein said safety function element is a shut-off device.

3. The safety function element according to claim 1, wherein said safety function element is a non-return valve.

4. The safety function element according to claim 1, further comprising an active element for engaging the fluid medium, said active element being capable of being actuated via a mechanical coupler acting through a leadthrough in said housing, with said active element being connected to said housing via a bellows, which divides the fluid medium from the leadthrough.

5. The safety function element according to claim 4, wherein an additional hollow space existing between said housing and said bellows is connected to an additional leak detection device for detecting leakage into said additional hollow space.

6. The safety function element according to claim 1, further comprising an active element for engaging the fluid medium, said active element being capable of being actuated via a mechanical coupler acting through a leadthrough in said housing, said leadthrough having one or more bushes resting against the mechanical coupler for effecting a tight seal.

7. The safety function element according to claim 1, wherein the hollow space is a vacuum.

8. The safety function element according to claim 1, wherein the hollow space is filled with a gas.

9. The safety function element according to claim 1, wherein the hollow space is filled with a compressed gas.

10. The safety function element according to claim 1, wherein said groove is connected to the hollow space of a double-walled safety line via an aperture in its flange.

11. The safety function element according to claim 1, wherein a cross-sectional area of said housing corresponds to an exterior line cross-section.

12. The safety function element according to claim 1, wherein said groove is disposed circumferentially to the line in the sealing surface of its seal.

* * * * *